(12) United States Patent
Mochizuki

(10) Patent No.: US 7,802,841 B2
(45) Date of Patent: Sep. 28, 2010

(54) STRADDLE TYPE VEHICLE

(75) Inventor: Kan Mochizuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 364 days.

(21) Appl. No.: 11/961,061

(22) Filed: Dec. 20, 2007

(65) Prior Publication Data

US 2008/0157562 A1    Jul. 3, 2008

(30) Foreign Application Priority Data

Dec. 28, 2006    (JP) .............................. 2006-356586

(51) Int. Cl.
     *B62D 25/16*    (2006.01)
(52) U.S. Cl. ...................... 296/198; 280/847
(58) Field of Classification Search ............. 296/181.1, 296/181.2, 181.5, 193.03, 198; 180/219; 280/847

See application file for complete search history.

(56) References Cited

U.S. PATENT DOCUMENTS 7,380,872 B2 *   6/2008   Konno et al. .............. 296/181.2
7,591,503 B2 *   9/2009   Schroeder et al. ........... 296/198

FOREIGN PATENT DOCUMENTS

JP      11-208556      8/1999

\* cited by examiner

*Primary Examiner*—Joseph D Pape
(74) *Attorney, Agent, or Firm*—Keating & Bennet, LLP

(57) ABSTRACT

A straddle-type vehicle having a plurality of body covers that are easily assembled and that have mating sections with an improved external appearance. A connection mechanism connects a leg shield and an under seat cover using a connecting member, and a fixing mechanism fixes the leg shield and the under seat cover using fixing hooks. The connection and fixing mechanisms are aligned with a mating section of the leg shield and the under seat cover.

10 Claims, 9 Drawing Sheets

STRADDLE TYPE VEHICLE

RELATED APPLICATIONS

This application claims the benefit of priority under 35 USC 119 of Japanese patent application no. 2006-356586, filed on Dec. 28, 2006, which application is hereby incorporated by reference in its entirety.

BACKGROUND OF THE INVENTION

1. Field of the Invention

The present invention relates to body covers for a straddle-type vehicle.

2. Description of Related Art

Straddle-type vehicles such as scooter or underbone motorcycles generally have a plurality of body covers that cover a vehicle body. Attempts have been made to improve the external appearance of such vehicles by reducing the gaps between mating sections of the body covers.

For example, a leg shield and a footboard may overlap and be joined (see, for example, JP-A-11-208556, pages 3 to 4 and FIG. 6). A clip that is attached to the leg shield engages the leg shield and the footboard. In addition, a bolt connects the leg shield and the footboard, and a top section of the bolt is covered by a cap. However, since a bolt, a clip and a cap are used, the assembly operation is complex.

SUMMARY OF THE INVENTION

The invention has been devised in light of these circumstances, and provides a straddle-type vehicle with a plurality of body covers that are easily assembled and that have mating sections with an improved external appearance.

A straddle-type vehicle according to the present invention comprises a body, a first body cover that covers a determined section of the body, and a second body cover adjacent to the first body cover. A connection mechanism connects the first and second body covers using a connecting member. A fixing mechanism fixes the first and second body covers using a fixed member that is fixed by a fixing member. The connection and fixing mechanisms are aligned with a mating section of the first and second body covers.

In the above-described straddle-type vehicle, since the connection and fixing mechanisms are aligned with the mating section of the first and second body covers, the first and second body covers can be reliably mated even if there is a degree of tolerance between them. In addition, by using a fixing mechanism formed by a fixed member fixed by a fixing member, the first and second body covers are easily assembled as compared to a structure that uses a connecting member made of bolts, screws and the like.

In another embodiment, two fixing mechanisms disposed at either side of the connection mechanism are aligned with the mating section of the first and second body covers.

In another embodiment, two connection mechanisms disposed at either side of the fixing mechanism are aligned with the mating section of the first and second body covers.

In another embodiment, the connection and fixing mechanisms are disposed in alignment with a single straight line.

In another embodiment, the connecting member includes a tightening member (screw) with a convex shape that is inserted from an outer side of the body into the first and second body covers, and an engagement member (spring nut) that engages with the tightening member to tighten together the first and second body covers.

In this embodiment, the tightening member may be inserted into the first and second body covers in a direction that is generally orthogonal to a surface of the mating section.

In another embodiment, the fixing member protrudes downward at the mating section, and a fixing hole into which the fixing member is inserted is formed in the fixed member.

Accordingly, the invention provides a straddle-type vehicle with a plurality of vehicle body covers that are easily assembled and that have mating sections with an improved external appearance.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
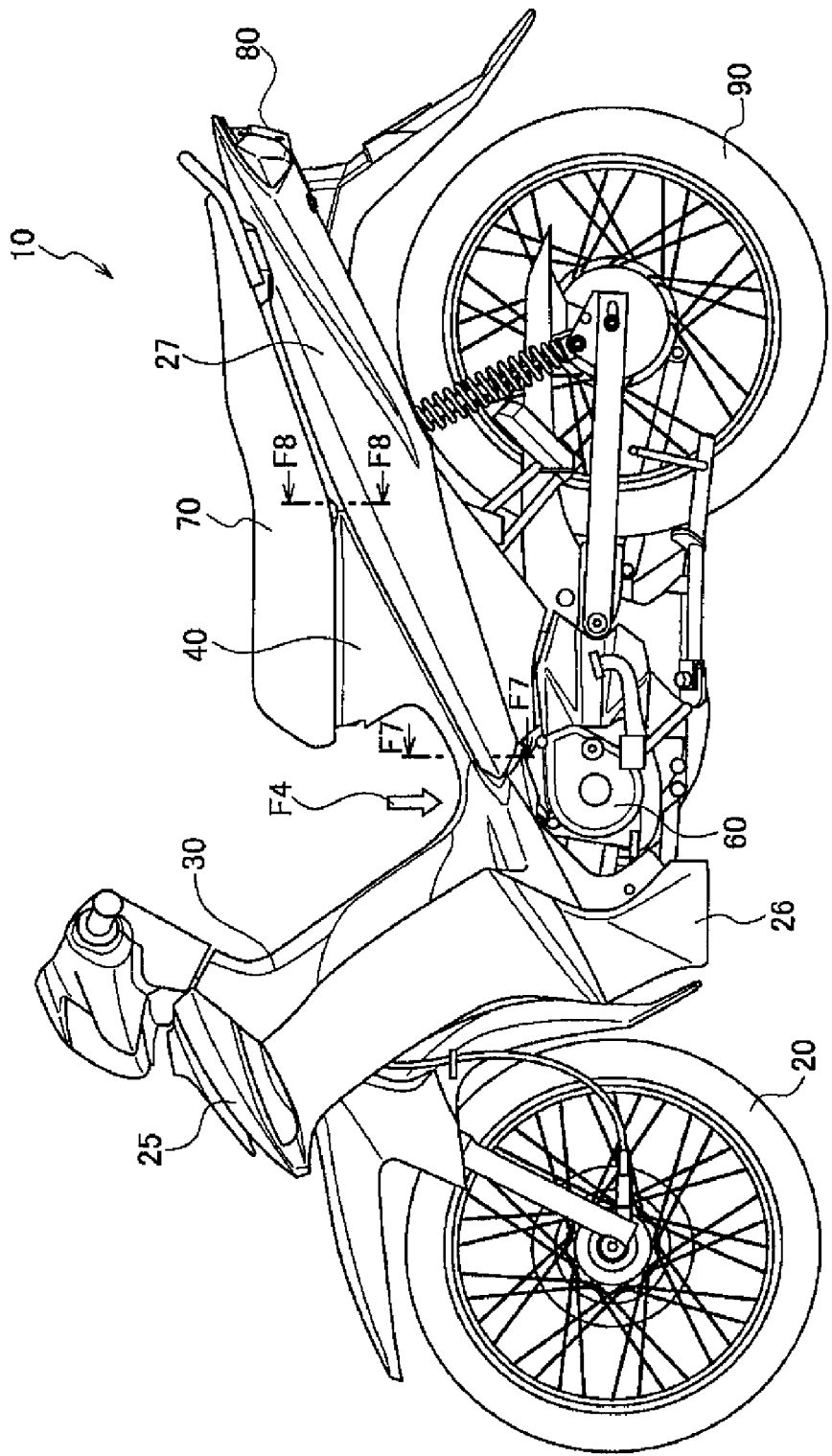
FIG. 1 is a left side view of a motorcycle according to an embodiment of the invention.

An embodiment of the invention is now described with reference to the drawings. In the drawings, structural members that are the same or similar are denoted with the same or similar reference numerals. The drawings are schematic, and thus the relative scale of dimensions and the like may be different to that of the real object. Specific dimensions and the like can be determined with reference to the following description. In addition, the relationship and scale of dimensions may vary from figure to figure.

(Structure of the Straddle-Type Vehicle)

Figure 2:
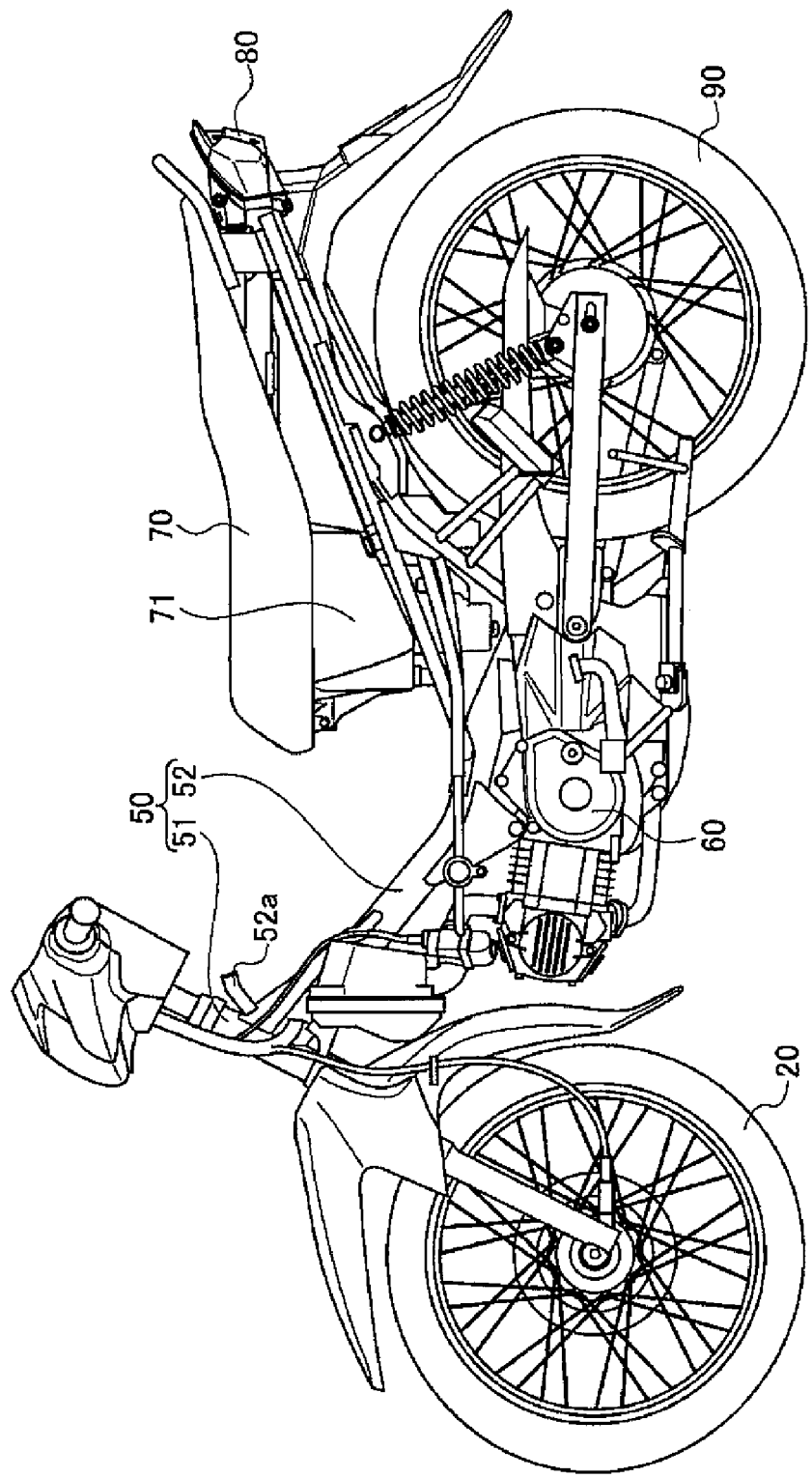
FIG. 2 is a left side view of the motorcycle with vehicle body covers removed.

FIG. 1 is a left side view of a motorcycle 10 that is a straddle-type vehicle according to the invention. FIG. 2 is a left side view of motorcycle 10 with its body covers removed. Motorcycle 10 is an underbone motorcycle with a body frame 50 that is disposed further downward as compared to a standard straddle-type motorcycle.

Motorcycle 10 has a front wheel 20 and a rear wheel 90. An engine 60 generates driving force that drives rear wheel 90. Body frame 50 includes a steering head pipe 51 that is disposed above front wheel 20 and a down tube 52 that extends from steering head pipe 51.

Motorcycle 10 is covered by a plurality of vehicle body covers including a body cowl 25, an under cover 26, a side cover 27, a leg shield 30, and an under seat cover 40. Body cowl 25 is disposed in front of steering head pipe 51 and extends downward. Under cover 26 is disposed beneath body cowl 25 and leg shield 30. Under cover 26 is attached to body cowl 25 and leg shield 30. Side cover 27 covers a left side section of motorcycle 10; a similar side cover (not shown) is disposed on the right side of motorcycle 10. Side cover 27 extends from a lower end of leg shield 30 to a tail lamp unit 80.

Leg shield 30 is disposed in front of the legs of a rider who sits on a seat 70. In this embodiment, leg shield 30 forms a first body cover that covers a determined section of body frame 50.

Under seat cover 40 is disposed beneath seat 70 and is connected to leg shield 30. In this embodiment, under seat cover 40 forms a second body cover that is disposed adjacent to the first body cover (leg shield 30). A luggage storage box 71 is provided beneath seat 70 and is covered by under seat cover 40.

(Attachment State of the Leg Shield)

Figure 3:
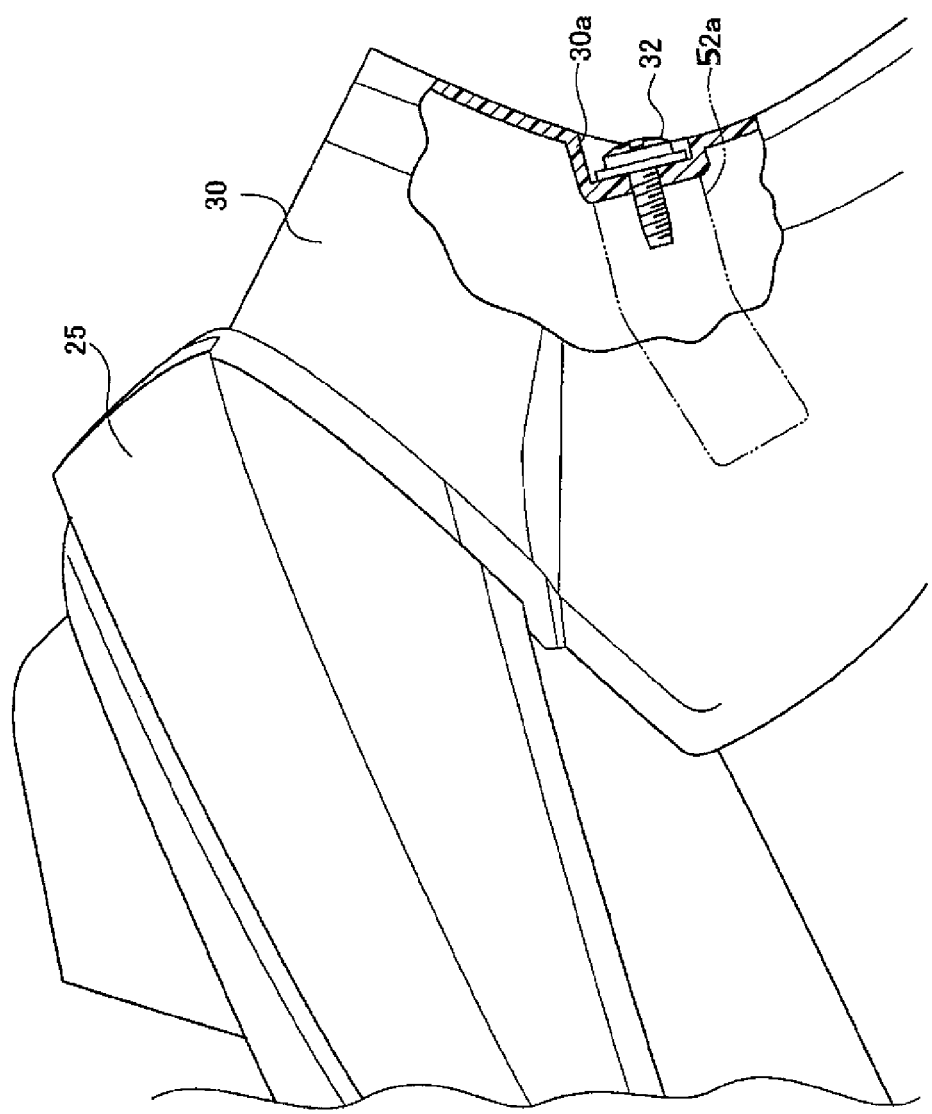
FIG. 3 shows an attachment section of a leg shield and a down tube according to an embodiment of the invention.

FIG. 3 shows an attachment section of leg shield 30 and down tube 52. Leg shield 30 includes an attachment member 30a that overlaps and mates with an attachment stay 52a formed in down tube 52. A screw 32 is inserted in attachment member 30a to attach leg shield 30 to attachment stay 52a.

Figure 7:
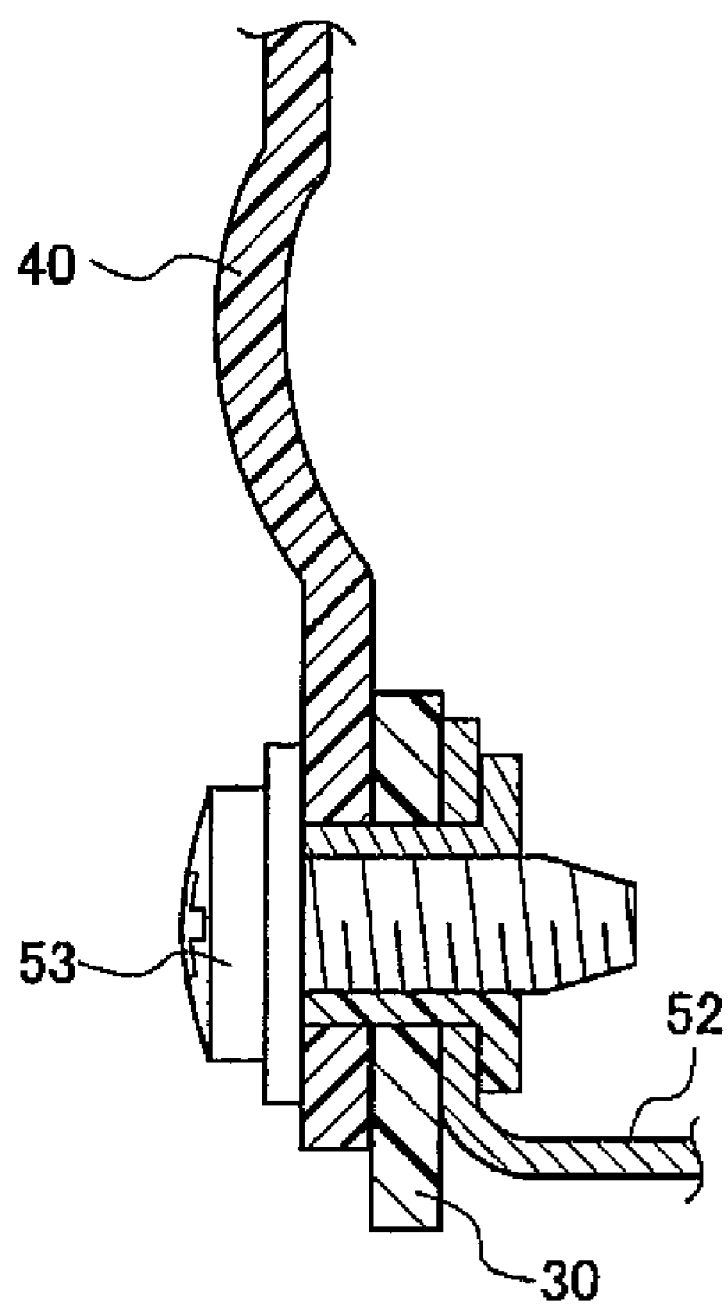
FIG. 7 is a cross sectional view along line F7-F7 of FIG. 1.

Body cowl 25 can be attached and removed while leg shield 30 is attached to down tube 52. Leg shield 30 is attached to down tube 52 at positions in addition to attachment member 30a (refer to FIG. 7).

(Structure of the Mating Section of the Leg Shield and Under Seat Cover)

Figure 4:
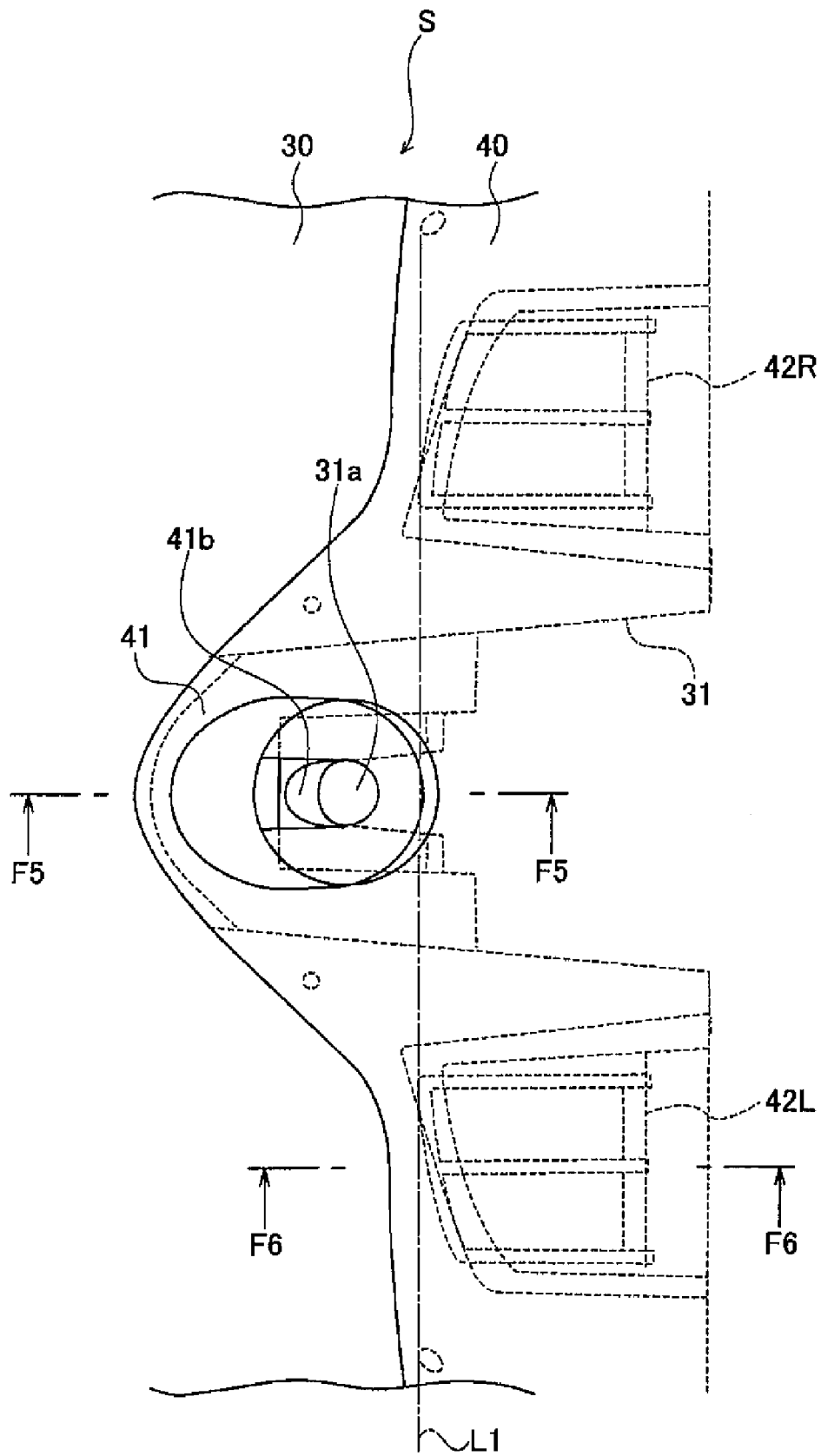
FIG. 4 is a plan view of a mating section of the leg shield and an under seat cover according to an embodiment of the invention.
Figure 5:
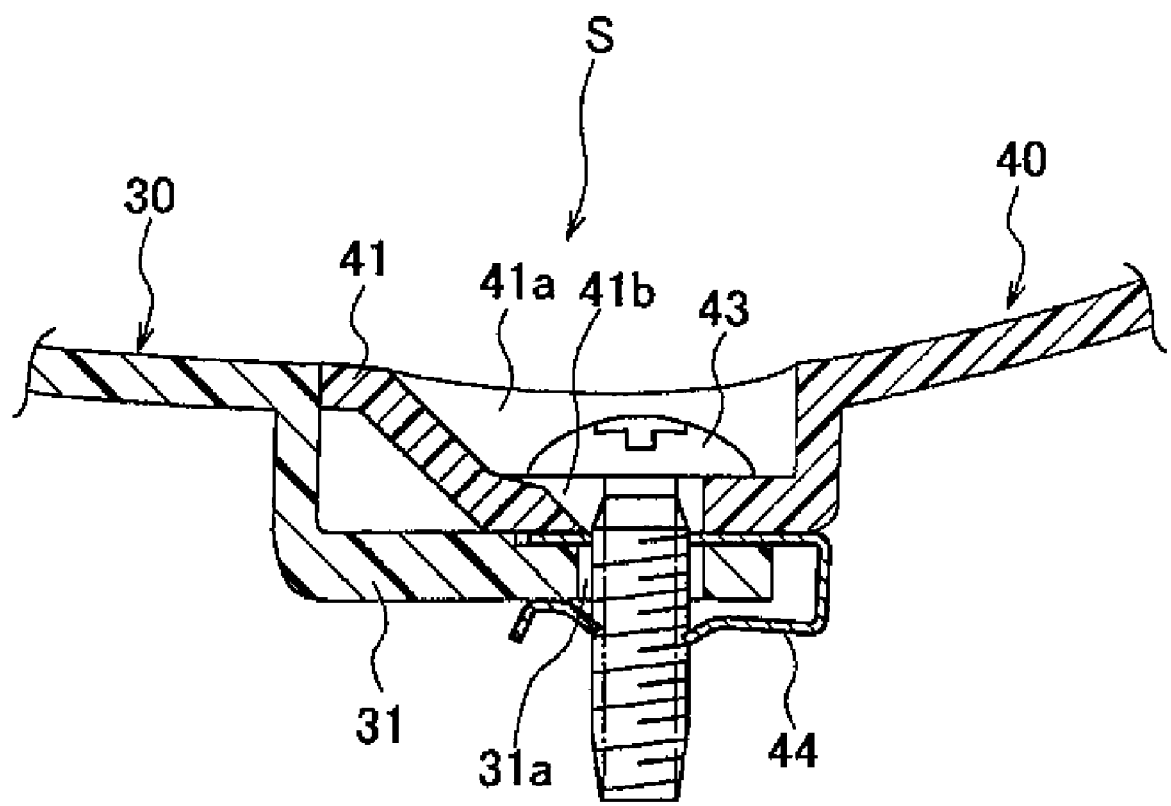
FIG. 5 is a cross sectional view along line F5-F5 of FIG. 4.
Figure 6:
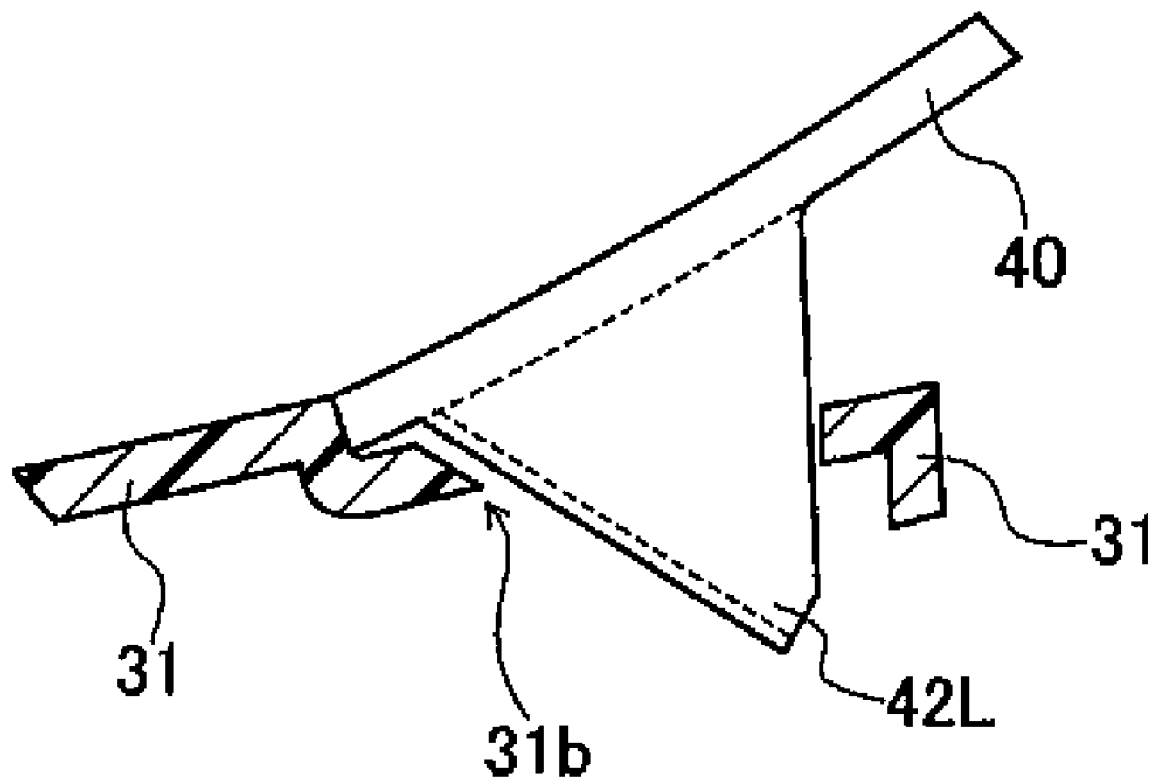
FIG. 6 is a cross sectional view along line F6-F6 of FIG. 4.

The structure of a mating section S of leg shield 30 (first body cover) and under seat cover 40 (second body cover) is now described. FIG. 4 is a plan view of mating section S in the direction of arrow F4 of FIG. 1. FIG. 5 is a cross sectional view along line F5-F5 of FIG. 4. FIG. 6 is a cross sectional view along line F6-F6 of FIG. 4.

As shown in FIGS. 4 and 5, a protrusion 41 that overlaps and mates with leg shield 30 is formed in a front end of under seat cover 40. A rear edge member 31 that overlaps and mates with under seat cover 40 is formed in a rear end of leg shield 30. Rear edge member 31 is positioned beneath protrusion 41.

A cavity 41a is formed in protrusion 41, and a head of a screw 43 is disposed therein. Screw 43 is screwed in to a spring nut 44. Cavity 41a has an oval shape in a plan view. An insertion hole 41b through which screw 43 is inserted is formed in protrusion 41. The length of insertion hole 41b in the front-rear direction is longer than the diameter of screw 43.

An insertion hole 31a, in to which screw 43 is inserted, is formed in rear edge member 31 that overlaps and mates with protrusion 41. Screw 43 is inserted into leg shield 30 and under seat cover 40 in a direction that is generally orthogonal to the surface of mating section S. In this embodiment, rear edge member 31 and protrusion 41 form a connection mechanism that connects the first body cover and the second body cover using a connecting member (screw 43 and spring nut 44).

In this embodiment, screw 43 forms a tightening member with a convex shape that is inserted into the vehicle body, and more specifically is inserted into leg shield 30 and under seat cover 40 from the outer side of body frame 50. Spring nut 44 forms an engagement member that is engaged with screw 43 to tighten together leg shield 30 and under seat cover 40.

As shown in FIGS. 4 and 6, fixing hooks 42L, 42R (fixing members) that fix leg shield 30 are provided in under seat cover 40. Fixing holes 31b to which fixing hooks 42L, 42R are fixed are formed in rear edge member 31 of leg shield 30. Fixing hooks 42L, 42R protrude downward when under seat cover 40 is viewed from the side and have a generally triangular shape with a pointed tip. Fixing hooks 42L, 42R are fitted into fixing holes 31b from above leg shield 30 to fix leg shield 30 to under seat cover 40. In this embodiment, fixing hooks 42L, 42R and fixing holes 31b formed in rear edge member 31 form a fixing mechanism.

The connection mechanism formed by rear edge member 31 and protrusion 41 and the fixing mechanism formed by fixing hooks 42L, 42R and fixing holes 31b are in alignment with mating section S of leg shield 30 and under seat cover 40. More particularly, the connection and fixing mechanisms are aligned with a straight line L1 (FIG. 4). Alignment with straight line L1 does not necessarily require that the centers of the connection and fixing mechanisms are disposed on straight line L1. In addition, straight line L1 is not necessarily in alignment with the vehicle width direction. More particularly, in this embodiment, two fixing mechanisms (fixing holes 31b and fixing hooks 42L, 42R) are disposed to either side of the connection mechanism (rear edge member 31 and protrusion 41) in alignment with mating section S.

(Attachment State of the Under Seat Cover)

The attachment state of under seat cover 40 is now explained. As can be seen from FIG. 7, which is a cross sectional view along line F7-F7 of FIG. 1, under seat cover 40 is connected by a screw 53 with a washer attached thereto to down tube 52 and leg shield 30. Under seat cover 40 is connected to down tube 52 on a right side of motorcycle 10 using a structure that is generally symmetrical to that of FIG. 7. As can be seen from FIGS. 4, 5 and 7, leg shield 30 and under seat cover 40 are connected at a central section of under seat cover 40 (rear edge member 31 and protrusion 41) and at both side sections.

Figure 8:
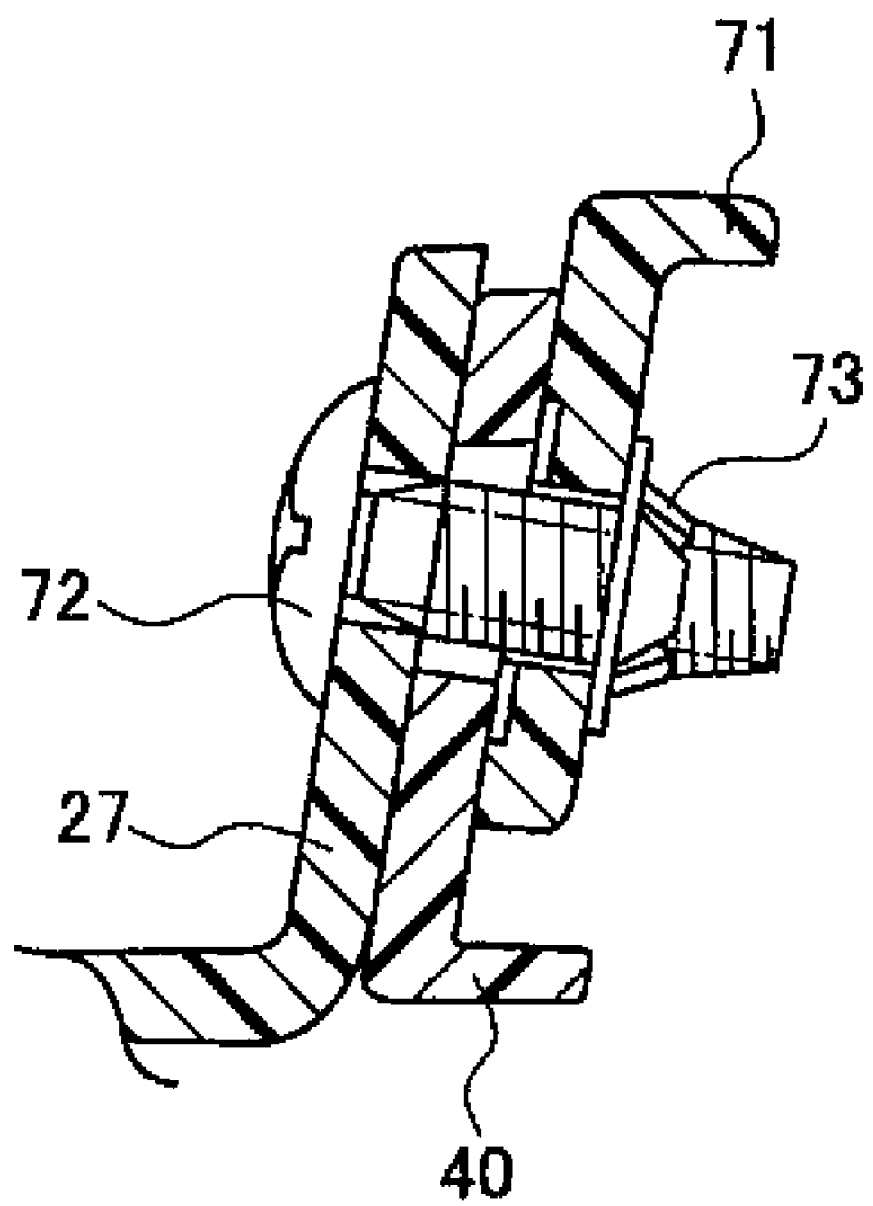
FIG. 8 is a cross sectional view along line F8-F8 of FIG. 1.

As shown in FIG. 8, which is a cross sectional view along line F8-F8 of FIG. 1, under seat cover 40, side cover 27 and luggage storage box 71 are connected using a screw 72 and a spring nut 73 at a rear end of luggage storage box 71.

(Operation/Advantages)

In motorcycle 10, the connection mechanism (rear edge member 31 and protrusion 41) and the fixing mechanism (fixing holes 31b and fixing hooks 42L, 42R) are provided in alignment with mating section S of leg shield 30 and under seat cover 40. As a result, even if there is a degree of tolerance between leg shield 30 and under seat cover 40, leg shield 30 and under seat cover 40 can be reliably mated. In addition, as a result of using a fixing mechanism comprising fixing holes 31b that are fixed by fixing hooks 42L, 42R, it is easy to assemble leg shield 30 with under seat cover 40 as compared to a structure that uses a connecting member made of bolts, screws and the like.

In this embodiment, two fixing mechanisms (fixing holes 31b and fixing hooks 42L, 42R) disposed to either side of the connection mechanism (rear edge member 31 and protrusion 41) are provided in alignment with mating section S, in particular, in alignment with straight line L1. As a result, leg shield 30 and under seat cover 40 can be mated even more reliably.

In this embodiment, screw 43 and spring nut 44 are used to tighten together leg shield 30 and under seat cover 40. Screw 43 is inserted into leg shield 30 and under seat cover 40 so as to be generally orthogonal with the surface of mating section S. Thus, leg shield 30 and under seat cover 40 are inhibited from separating from each other in the upward-downward direction, and are thus mated even more reliably.

In this embodiment, fixing hooks 42L, 42R protrude downward at mating section S, and are inserted into fixing holes 31b formed in rear edge member 31. As a result, leg shield 30 and under seat cover 40 are inhibited from separating from each other in the front-rear direction, and are thus mated even more reliably.

OTHER EMBODIMENTS

The invention has been disclosed by describing an embodiment of the invention. However, the description and the drawings that form this disclosure do not limit the invention, and are a basis for various different embodiments.

Figure 9:
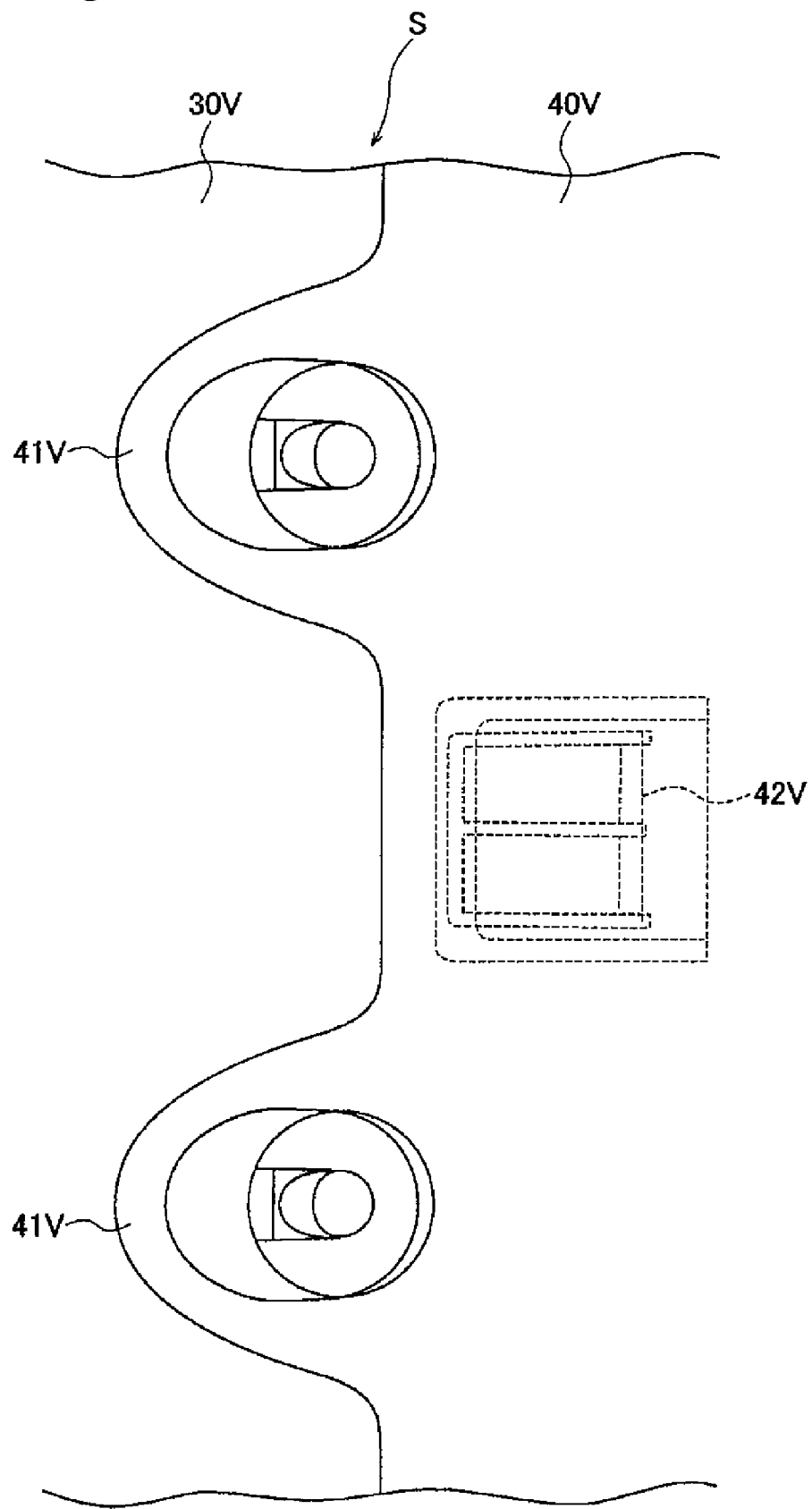
FIG. 9 is a plan view of a mating section of a leg shield and an under seat cover according to another embodiment of the invention.

For example, the structure of the connection mechanism and the fixing mechanism may be changed as shown in FIG. 9. As can be seen from FIG. 9, an under seat cover 40V is provided with a fixing hook 42V at a central section in the vehicle width direction. Fixing hook 42V has a structure that is generally the same as that of fixing hook 42L.

Protrusions 41V are provided to either side of fixing hook 42V. Protrusion 41V has a structure that is generally the same as that of protrusion 41. Fixing holes that are generally the same as fixing holes 31b are formed in a leg shield 30V at positions that correspond to protrusions 41V.

In this modified example, fixing hook 42V (the fixing mechanism) is provided in alignment with mating section S of leg shield 30V and under seat cover 40V. Protrusions 41V are provided to either side of fixing hook 42V in alignment with mating section S.

The number of connection and fixing mechanisms is not limited to the above-described embodiments. Furthermore, connecting members such as, for example, a rivet or clip may be used in place of screw 43 and spring nut 44.

Thus, the invention includes various modified embodiments not described here. Accordingly, the invention is defined by the following claims having a scope that is reasonable in view of the above description.

The invention claimed is:

1. A straddle-type vehicle comprising:
   a body;
   a first body cover arranged to cover a section of the body;
   a second body cover arranged adjacent to the first body cover;
   a connection mechanism arranged to connect the first body cover to the second body cover using a connecting member, the connecting member including a screw and an engaging member; and
   a fixing mechanism arranged to fix the first body cover to the second body cover using a fixing member, the fixing member including a fixing hook provided on one of the first body cover and the second body cover and a fixing hole arranged to receive the fixing hook provided on the other of the first body cover and the second body cover; wherein
   the connection mechanism and the fixing mechanism are aligned along a mating section of the first body cover and the second body cover; and
   the fixing mechanism includes a first fixing mechanism arranged adjacent to a first side of the connection mechanism and a second fixing mechanism arranged adjacent to a second side of the connection mechanism.

2. The straddle-type vehicle according to claim 1, wherein the connection mechanism, the first fixing mechanism, and the second fixing mechanism are aligned along a single straight line.

3. The straddle-type vehicle according to claim 1, wherein the engaging member includes a nut, the screw is arranged to be inserted from an outer side of the first body cover and the second body cover, and the nut is arranged to engage with the screw to tighten the first body cover to the second body cover.

4. The straddle-type vehicle according to claim 3, wherein the screw is inserted into the first body cover and the second body cover in a direction that is substantially perpendicular to a surface of the mating section.

5. The straddle-type vehicle according to claim 1, wherein the first body cover is a leg shield and the second body cover is an under seat cover.

6. The straddle-type vehicle according to claim 1, wherein the second body cover includes a protrusion arranged to overlap with a rear edge member of the first body cover, and the connection mechanism is located in the protrusion.

7. The straddle-type vehicle according to claim 6, wherein the protrusion includes a cavity, and the screw is located within the cavity.

8. The straddle-type vehicle according to claim 7, wherein the cavity includes a hole, the rear edge member includes a hole, and the screw is inserted through the hole in the cavity, the hole in the rear edge member, and engaged with the engaging member.

9. The straddle-type vehicle according to claim 8, wherein the engaging member includes a spring nut.

10. The straddle-type vehicle according to claim 6, wherein the fixing hook is provided on the second body cover and the fixing hole is provided in the rear edge member of the first body cover.

\* \* \* \* \*